Feb. 14, 1956   W. VAUGHAN   2,734,322

DEVICE FOR ATTACHING A LENS BLANK OR THE LIKE WITH ITS HOLDER

Original Filed Dec. 30, 1950

INVENTOR
WILLIAM VAUGHAN
BY
*Louis L. Gagnon*
ATTORNEY

United States Patent Office 2,734,322
Patented Feb. 14, 1956

2,734,322

DEVICE FOR ATTACHING A LENS BLANK OR THE LIKE WITH ITS HOLDER

William Vaughan, Rochester, N. Y., assignor to American Optical Company, Southbridge, Mass., a voluntary association of Massachusetts Original application December 30, 1950, Serial No. 203,603. Divided and this application July 2, 1952, Serial No. 296,866

3 Claims. (Cl. 51—277)

This application is a division of co-pending application S. N. 203,603 filed December 30, 1950, and relates to improvements in means for attaching a work piece such as a lens blank in its holder.

A principal object of the invention is the provision of an aligning and centering fixture for attaching an article such as a marked lens to holding means such as a suction cup provided with means fixedly secured thereto for subsequent attachment to the holders of various devices for performing different operations thereon, said means being so shaped that when the cup is attached to the holders, or is being transferred from one to another thereof, the article will be constantly retained in desired predetermined centered and axial position whereby the resultant operations will be performed without the possibility of error due to displacement which might occur particularly when the article is being transferred from one device to another.

Other objects and advantages will become apparent from the following description taken in connection with the accompanying drawings, in which.

Figure 1:
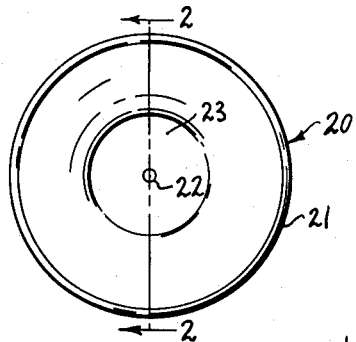
Fig. 1 is an enlarged front elevational view of a suction cup device with which a lens blank is to be assembled by use of the device embodying the present invention.

In the manufacture of articles such as ophthalmic lenses, the lens blanks, prior to being cut to substantially the contour shape desired and subsequently edge ground to the resultant configuration, are generally provided with marks on one of their surfaces for indicating the optical centers and axes thereof. In subsequently providing the blanks with the desired contour shapes, particularly in the cases of irregularly shaped lenses, it is necessary that the lens centers and axes be maintained in predetermined position whereby the resultant lenses, when mounted in positions of use, will be accurately located and perform efficiently.

In producing a lens by many prior art methods, it has been necessary to provide means associated with the cutting device for axially aligning and centering a lens blank prior to the cutting operation, and then after removing the cut blank from the device it has been necessary to align and center it in a separate fixture for holding it to an edging machine in desired relation with respect to a pattern. Since in the edging operation the pattern rotates with and controls the resultant contour shape of the lens, it is, therefore, essential that the lens blank be mounted with its optical axes in predetermined relation with the known axes of the pattern.

The present invention differs from and improves upon the known prior art in providing a simple and practicable device by which a suction cup may be attached to a lens blank in predetermined axial and centered position whereby it may be properly mounted successively in the holders of a number of instruments or machines without requiring realignment of the blank prior to each operation or the use of additional separate fixtures which might become easily misplaced or damaged or which might permit the inadvertent misalignment of the lens during the transfer to said respective instruments or machines. The present invention also obviates the necessity of providing the instruments or machines with separate intricate and expensive means for aligning and centering the lens blank prior to the operations to be performed thereon.

Referring more particularly to the drawings wherein like characters of reference designate like parts throughout the several views, there is illustrated a suction cup 20 formed of rubber or similar resilient material and preferably having its outer peripheral edge formed with a thin annular bead 21 which aids in the holding function of the device. The cup 20 is substantially bowl-shaped and the walls or sides thereof have relatively thin marginal portions which increase in thickness toward the base which is of substantial thickness and rigidity. The cup is provided on its inner surface with a centrally located alignment mark 22 such as a bullseye, cross, dot, recess or similar means for use in aligning the center of a lens blank to be attached to the cup 20 as will be more fully described hereinafter. The rear of the base portion 23 of the cup 20 is formed with a hollowed out area which is adapted to receive one end of a block 24. The block 24 is preferably formed of metal or other rigid material and has a main body portion 25 which is substantially rectangular in shape and a short neck portion 26 which extends into the material of the cup 20 and terminates in a flat plate-like or flange portion 27 which is embedded in the hollowed out area of the cup. The block 24 is attached to the cup 20 preferably at the time the cup is molded since it is essential that it be immovably and permanently connected thereto. To insure that the block 24 will not move with respect to the cup 20 after assembly therewith, the block is formed with a pair of spaced protrusions 28 at each end of the plate-like or flange portion 27. Thus, when molding the cup 20, material from which the cup is formed will fill in the space between the protrusions 28 and between the plate-like or flange portion 27 and main body portion 25, thus immovably uniting the parts.

Figure 2:
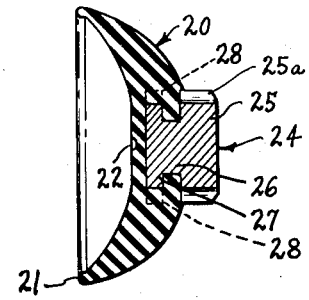
Fig. 2 is an enlarged sectional view taken on line 2—2 of Fig. 1.
Figure 3:
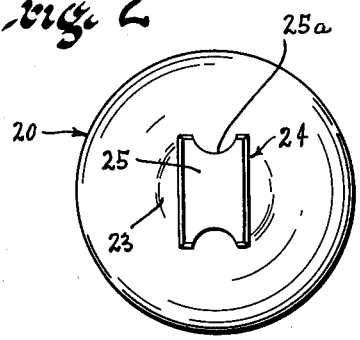
Fig. 3 is an enlarged elevational view of the device shown in Fig. 1.

The body portion 25 of the block 24 may, if desired, be formed to other predetermined irregular shapes, other than circular, it being necessary, however, to provide means on the instruments or machines with which the device is to be used which are provided with cavities for receiving the block and which, therefore, must be shaped to comate therewith. The ends of the body portion 25 are notched 25a as clearly shown in Figs. 2 and 3 for reception of pins carried by holders used in edging machines as will be described hereinafter. Such a holding device is claimed in copending application Serial Number 296,865 filed July 2, 1952, and which is a divisional application of the same parent application as of the instant application.

Figure 4:
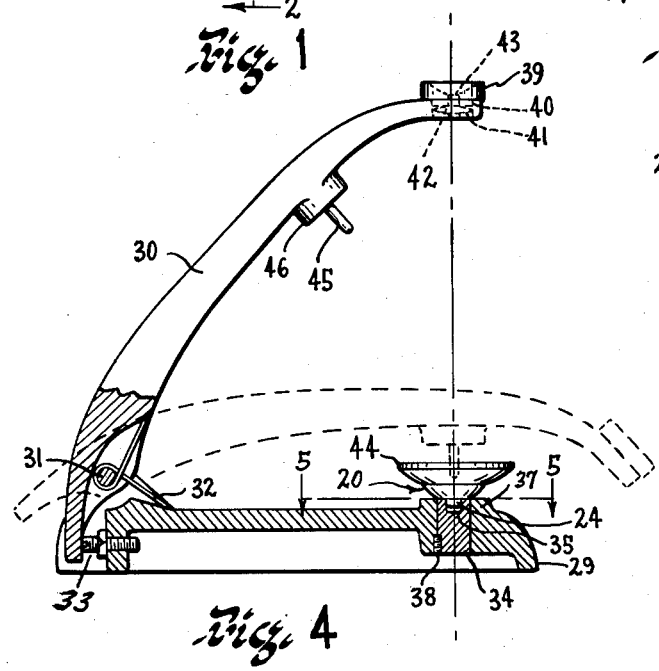
Fig. 4 is a side elevational view partly in section of a fixture embodying the invention for attaching lenses to the suction cup devices.

The invention herein described and claimed is illustrated in Fig. 4 and embodies a special fixture used for attaching a lens blank to the suction cup 20. It comprises a base 29 and an arm 30 having one end pivotally connected to one end of the base as at 31. A spring 32 normally urges the arm 30 into an upright position while an adjustable stop 33 carried by the end of the base 29 is adapted to be engaged by the arm 30 to limit the extent of upward movement thereof.

Figure 5:
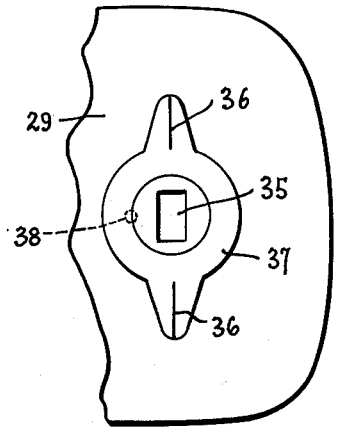
Fig. 5 is a fragmentary top plan view taken on line 5—5 of Fig. 4 and looking in the direction of the arrows.

The base 29 carries adjacent its other end a cylindrical aligning chuck 34 which is provided in its upper end with a recess 35 (Fig. 5) shaped to receive the block 24 on the suction cup 20. The chuck 34 is adapted to be rotated in the base 29 to align the recess 35 with respect to a pair of spaced indicating lines 36 located on a raised portion 37 of the base 29 and to be subsequently locked in aligned position by means of a screw 38.

The free end of the arm 30 is adapted to be normally positioned above the chuck 34 and carries on its upper surface a disc-like member 39 having an extension 40 formed integral therewith. The extension 40 is positioned within a recess 41 formed in the arm 30 near the end thereof. Between the end of the extension 40 and inner surface of the recess 41 is located a lens 42 and a sight opening 43 is formed in the member 39 and extension 40 thereof whereby an operator can sight toward the chuck 34 through the sighting lens 42. Thus, when a suction cup 20 is positioned on the chuck 34 with the block 24 located in the recess 35, a lens blank 44 can be positioned on the cup 20 and centered with respect to the identification mark 22 by the operator when sighting through the sight opening 43. It is to be understood that the lens blank 44 must have been previously provided with identification marks indicating its optical center and axes. At the time the lens blank is being centered it can also be axially aligned with the identification marks 36 formed on the base 29. The sighting opening 43, being elongated and of small diameter, prevents parallax errors and the sighting lens 42 provides the necessary visual accommodation for the distance between the sight opening and chuck.

After the lens blank has been centered and aligned the arm 30 is swung downwardly about the pivot 31 to a position where one or more pins 45 extending from a block 46 attached to the lower surface of the arm 30 engage the lens blank 44. Continued pressure will force the lens blank 44 against the suction cup 20 and cause it to become attached thereto.

Thus, since the cup 20 and block 24 are held in prelocated axial position, it is apparent that a lens blank can be attached to the cup 20 in predetermined and controlled axial and centered relation, therewith.

It will be apparent that many changes may be made in the details of constructions and arrangement of parts shown and described without departing from the spirit of the invention as expressed in the accompanying claims. Therefore, it is to be understood that all matter set forth or shown in the accompanying drawing is to be interpreted as illustrative and not in a limiting sense.

I claim:

1. A device for use in attaching an article such as a lens to a suction-cup type holder so that it will be held thereby in a predetermined axial and centered relation therewith, said device comprising a base having retaining means for receiving the holder, axis indicating means on said base with which an article such as a lens may be aligned when positioned on the suction-cup type holder, an arm pivotally connected to said base at a predetermined spaced location from said retaining means, means maintaining the free end of said arm normally in a fixed spaced position over said retaining means, sighting means carried by said free end of the arm and vertically aligned with said retaining means when said free end of the arm is in its normally spaced position over the retaining means, and an engagement portion on said arm at a distance from the location of said pivotal connection equal to the distance between the retaining means and said location, said engagement portion being adapted to engage the article when the arm is forcibly moved about its pivotal connection toward the article and holder supported by the retaining means so as to collapse or flatten the suction-cup type holder sufficiently to cause the article to adhere to the holder.

2. A device for use in attaching an article such as a lens to a suction-cup type holder so that it will be held thereby in a predetermined axial and centered relation therewith, said device comprising a base having retaining means for receiving the holder, axis indicating means on said base with which an article such as a lens may be aligned when positioned on the suction-cup type holder, an arm pivotally connected to said base at a predetermined spaced location from the center of said retaining means, spring means normally urging said arm in spaced relation over and away from said retaining means, sighting means carried by the free end of said arm and means controlling the spacing of said arm from the retaining means so that said sighting means will be vertically aligned with the center of said retaining means when said arm is in said normally spaced relation, and an engagement portion on said arm at a distance from the location of said pivotal connection equal to the distance between the center of said retaining means and said location, said engagement portion being adapted to engage the article when the arm is forcibly moved about its pivotal connection toward the retaining means so as to collapse or flatten the suction-cup type holder sufficiently to cause the article to adhere to the holder.

3. A device for use in attaching an article such as a lens to a suction-cup type holder so that it will be held thereby in a predetermined axial and centered relation therewith, said device comprising a base having retaining means for receiving the holder and maintaining it in a predetermined position, axis indicating means provided on said device with which markings on an article such as a lens may be aligned when said article is located on a suction-cup type holder received by said retaining means, an arm connected to said base and adapted to be moved toward and away from said base in a predetermined fixed path, sighting means on a portion of said arm, means maintaining said portion of the arm normally in spaced relation with the retaining means on said base and the sighting means in a predetermined alignment therewith, and an engagement portion on said arm, said engagement portion being adapted to engage the article when said arm is moved toward the base in said predetermined fixed path so as to collapse or flatten the suction-cup type holder sufficiently to cause the article to adhere to the holder.

References Cited in the file of this patent

UNITED STATES PATENTS

| | | |
|---|---|---|
| 1,275,447 | La Hodny | Aug. 13, 1918 |
| 1,356,656 | Pearson | Oct. 26, 1920 |
| 2,081,936 | Keenan | June 1, 1937 |
| 2,127,181 | Mattern | Aug. 16, 1938 |
| 2,223,214 | Kinney | Nov. 26, 1940 |
| 2,342,146 | Joyce | Feb. 22, 1944 |
| 2,520,977 | Suben | Sept. 5, 1950 |
| 2,542,101 | Suben | Feb. 20, 1951 |
| 2,573,056 | Polinske | Oct. 30, 1951 |